US006566007B1

(12) United States Patent
Takeuchi et al.

(10) Patent No.: US 6,566,007 B1
(45) Date of Patent: May 20, 2003

(54) SYNTHETIC METHOD FOR PREPARATION OF A LOW SURFACE AREA, SINGLE PHASE SILVER VANADIUM OXIDE

(75) Inventors: Esther S. Takeuchi, East Amherst, NY (US); Randolph A. Leising, Williamsville, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 0 days.

(21) Appl. No.: 09/549,910

(22) Filed: Apr. 14, 2000

(51) Int. Cl.[7] ............................................... H01M 4/54
(52) U.S. Cl. .................. 429/219; 429/231.1; 429/218.1
(58) Field of Search ............................. 429/219, 231.1, 429/218.1

(56) References Cited

U.S. PATENT DOCUMENTS

| | | | |
|---|---|---|---|
| 4,310,609 A | 1/1982 | Liang et al. ................. | 429/194 |
| 4,391,729 A | 7/1983 | Liang et al. ............. | 252/182.1 |
| 4,830,940 A | 5/1989 | Keister et al. .............. | 429/194 |
| 5,221,453 A | 6/1993 | Crespi ........................ | 204/291 |
| 5,472,810 A | 12/1995 | Takeuchi et al. ............ | 429/218 |
| 5,498,494 A | 3/1996 | Takeuchi et al. ............ | 429/219 |
| 5,516,340 A | 5/1996 | Takeuchi et al. ........... | 29/623.1 |
| 5,545,497 A * | 8/1996 | Takeuchi et al. ............ | 429/219 |
| 6,130,005 A * | 10/2000 | Crespi et al. ................ | 429/219 |
| 6,225,007 B1 | 5/2001 | Horne et al. | |

FOREIGN PATENT DOCUMENTS

| | | |
|---|---|---|
| EP | 1 058 326 A2 | 6/2000 |
| EP | 1 113 514 A1 | 12/2000 |
| EP | 1 146 581 A2 | 4/2001 |

OTHER PUBLICATIONS

Solid–State Cathode Materials For Lithium Batteries: Effect of Synthesis Temperature on the Physical and Electrochemical Properties of Silver Vanadium Oxide, Randolph A. Leising and Esther Sans Takeuchi, Chem.of Materials, 5,738–741 (1993) no month.
Effect Of Silver Content On the Performance Of Primary Lithium/Silver Vanadium Oxide Batteries, E.S. Takeuchi and P. Keister, Meeting Abstracts of the Battery Division, Electrochemical Society, Las Vegas, NV, Oct. 1985, Abstract No. 125.

* cited by examiner

Primary Examiner—Carol Chaney
(74) Attorney, Agent, or Firm—Michael F. Scalise

(57) ABSTRACT

A single phase silver vanadium oxide prepared from a mixture of a decomposable silver salt and vanadium oxide first heated at about 2° C. to about 40° C. above the decomposition temperature of the mixture followed by a second heating in a temperature range of about 490° C. to about 520° C. is described. The silver vanadium oxide material is coupled with a lithium anode and activated with a nonaquecus electrolyte to provide an improved high energy density electrochemical cell having increased pulse voltages and a reduction in voltage delay.

29 Claims, 10 Drawing Sheets

SYNTHETIC METHOD FOR PREPARATION OF A LOW SURFACE AREA, SINGLE PHASE SILVER VANADIUM OXIDE

BACKGROUND OF THE INVENTION

1. Field of the Invention

The present invention generally relates to the conversion of chemical energy to electrical energy, and more particularly, to an alkali metal electrochemical cell having a transition metal oxide cathode activated with a nonaqueous electrolyte. The transition metal oxide cathode active material is preferably silver vanadium oxide having a single phase with a surface area of about 0.2 m$^2$/gram to about 0.80 m$^2$/gram. The single phase silver vanadium oxide is produced in a decomposition reaction at a final decomposition temperature of about 490° C. to about 520° C.

2. Prior Art

U.S. Pat. Nos. 4,310,609 and 4,391,729 to Liang et al. disclose the preparation of silver vanadium oxide (SVO) as a cathode material for use in a nonaqueous electrolyte battery. These patents describe the preparation of silver vanadium oxide by a thermal decomposition reaction involving a final heat treatment step of about 360° C.

U.S. Pat. No. 4,830,940 to Keister et al. describes a solid cathode, liquid organic electrolyte, lithium cell for delivering high current pulses. The solid cathode includes as an active material Ag$_x$V$_2$O$_y$ wherein x is in the range from about 0.5 to about 2.0 and y is in the range from about 4.5 to 6.0. Keister et al. reference the publication "Effect of Silver Content On the Performance of Primary Lithium/Silver Vanadium Oxide Batteries", E. S. Takeuchi and P. Keister, *Electrochemical Society*, Oct. 13–18, 1985, Las Vegas, Nev., Abstract No. 125, which describes the preparation of silver vanadium oxide at about 360° C. from the thermal decomposition of silver nitrate and vanadium pentoxide.

U.S. Pat. No. 5,221,453 to Crespi discloses the preparation of silver vanadium oxide by a chemical addition reaction (combination of AgVO$_3$ and V$_2$O$_5$ or Ag$_2$O and V$_2$O$_5$) in a temperature range of about 300° C. to about 700° C. The chemical addition reaction is described as being distinct from the thermal decomposition reaction described by Liang et al. and Keister et al. A decomposition reaction is characterized by the evolution of nitrogen oxide gas when the reactants are V$_2$O$_5$ and AgNO$_3$. A chemical addition reaction does not include the evolution of reaction by product gases.

In the publication R. A. Leising and E. S. Takeuchi, *Chemistry of Materials*, 5, 738–742 (1993) the preparation of silver vanadium oxide by the thermal decomposition of AgNO$_3$ and V$_2$O$_5$ at temperatures of 320° C., 375° C., 450° C. and 540° C. is described. This publication also reports discharge results of experimental lithium cells containing silver vanadium oxide cathode active materials prepared at those various temperatures and activated with 1M LiAsF$_6$ PC/DME electrolyte. The 375° C. prepared SVO material gave slightly higher delivered capacity than the 450° C. material, and significantly higher capacity than the SVO material prepared at 540° C. As an illustration, the graph in FIG. 1, curve 10, was constructed from the discharge capacity versus synthesis temperature of lithium cells having silver vanadium oxide prepared in a thermal decomposition reaction of AgNO$_3$ and V$_2$O$_5$ according to this publication. The delivered capacity of the variously prepared cells was measured using a constant resistance discharge over a short period of time (less than 2 days).

SUMMARY OF THE INVENTION

The present invention relates to a nonaqueous electrolyte, alkali metal/transition metal oxide electrochemical cell and, in particular, a lithium/silver vanadium oxide electrochemical cell designed for high current pulse discharge applications while exhibiting reduced or no appreciable voltage delay and reduced Rdc build-up. An example of such an application is an implantable cardiac defibrillator, where the battery may run under a light load, device monitoring mode for extended periods of time interrupted by high rate, current pulse discharge during device activation. Voltage delay is a phenomenon typically exhibited in a lithium/silver vanadium oxide cell that has been depleted of about 40% to about 70% of its capacity and is subjected to current pulse discharge applications. The occurrence of voltage delay is detrimental because it may result in delayed device activation and shortened device life.

The desirable decrease in voltage delay is realized in lithium cells that, according to the present invention, contain a low surface area, single phase silver vanadium oxide prepared in a decomposition reaction at a temperature above the decomposition temperature of the mixture of starting materials followed by a second heating at a temperature in the range of about 490° C. to about 520° C. and are activated with a nonaqueous electrolyte.

A particularly preferred transition metal oxide cathode active material comprises a single phase silver vanadium oxide having the general formula Ag$_x$V$_2$O$_y$ wherein in the ε-phase x=1.0 and y=5.5. According to the present invention, this material is produced in a decomposition reaction by first heating the mixture of starting materials to a temperature above the decomposition temperature of the mixture followed by a second heating at a final heating temperature of about 490° to about 520° C. This particularly preferred SVO material is in contrast to β-phase silver vanadium oxide having in the general formula x=0.35 and y=5.18 and γ-phase silver vanadium oxide having in the general formula x=0.74 and y=5.37. The surface area of this material is about 0.2 m$^2$/gram to about 0.80 m$^2$/gram.

A typically used electrolyte for activating this electrochemical couple comprises 1M LiAsF$_6$ dissolved in a 50:50 mixture, by volume, of PC and DME. The increase in usable cell capacity, and subsequent increase in battery life in such a cell is unexpected based on the published capacity data for 450° C. and 540° C. SVO discharged under quick discharge conditions. Again, in the previously discussed Leising et al. publication, the 450° C. SVO gave less capacity than SVO prepared at 375° C., and it could be inferred that the further the preparation temperature is from 375° C., the less capacity the cell will provide.

DETAILED DESCRIPTION OF THE PREFERRED EMBODIMENTS

Figure 1:
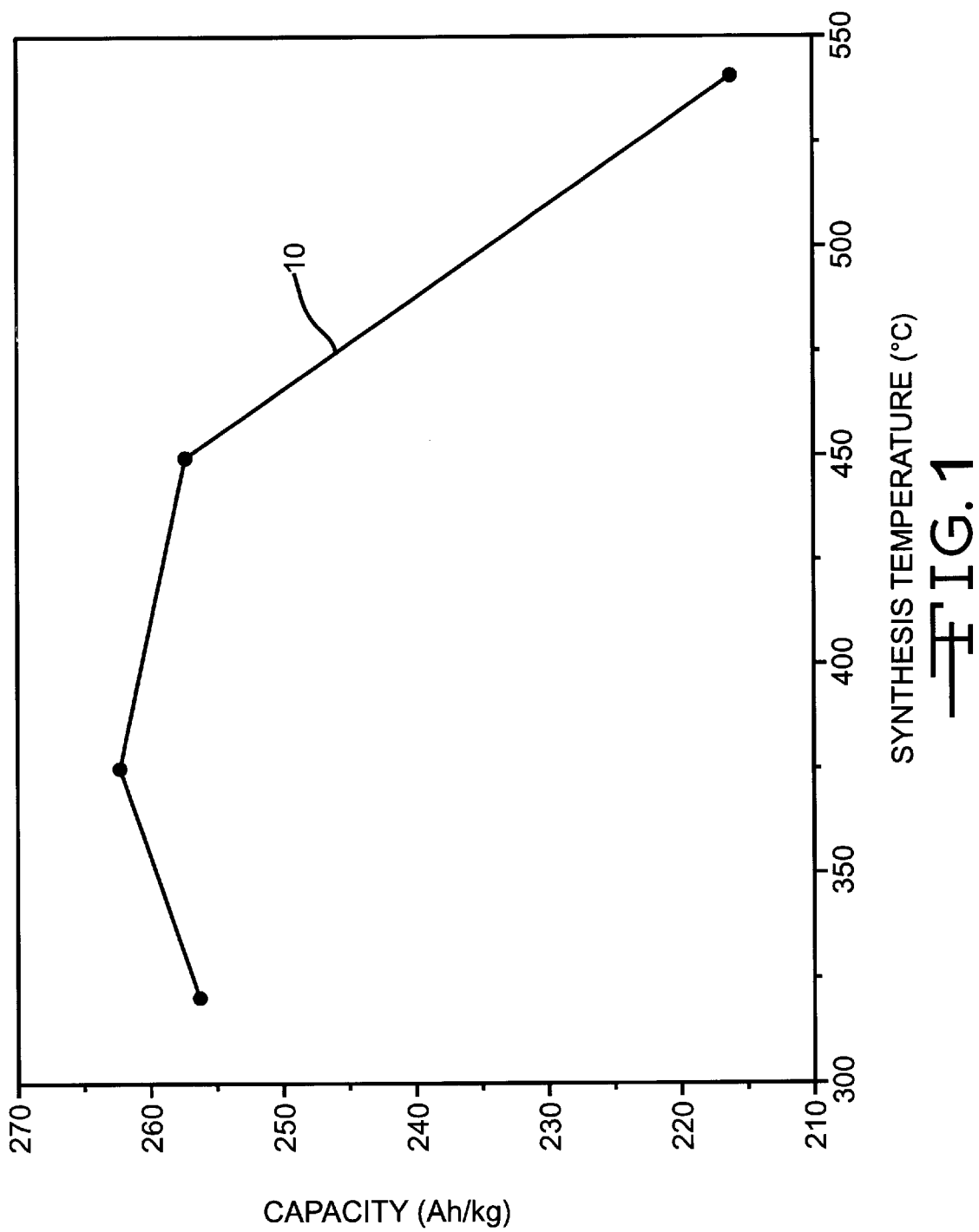
FIG. 1 is a graph constructed from the discharge capacity versus synthesis temperature of lithium cells having silver vanadium oxide prepared in a prior art thermal decomposition reaction of AgNO$_3$ and V$_2$O$_5$.

As used herein, the term "pulse" means a short burst of electrical current of a greater amplitude than that of a prepulse current immediately prior to the pulse. A pulse train consists of at least two pulses of electrical current delivered in relatively short succession with or without open circuit rest between the pulses.

Lower pulse voltages caused by voltage delay, even if only temporary, are undesirable since they can cause circuit failure in device applications, and effectively result in shorter cell life. Rdc build-up also reduces the life of an electrochemical cell by lowering the pulse voltage during high rate discharge. As is well known by those skilled in the art, an implantable cardiac defibrillator is a device that requires a power source for a generally medium rate, constant resistance load component provided by circuits performing such functions as, for example, the heart sensing and pacing functions. From time to time, the cardiac defibrillator may require a generally high rate, pulse discharge load component that occurs, for example, during charging of a capacitor in the defibrillator for the purpose of delivering an electrical shock to the heart to treat tachyarrhythmias, the irregular, rapid heartbeats that can be fatal if left uncorrected. Accordingly, reduction and even elimination of voltage delay during a current pulse application is important for proper device operation and extended device life.

The electrochemical cell of the present invention is particularly suited for powering an implantable medical device such as a cardiac defibrillator and the like. The cell comprises an anode of a metal selected from Groups IA, IIA and IIIB of the Periodic Table of the Elements, including lithium, sodium, potassium, etc., and their alloys and intermetallic compounds including, for example, Li—Si, Li—Al, Li—B and Li—Si—B alloys and intermetallic compounds. The preferred anode comprises lithium. An alternate anode comprises a lithium alloy, such as lithium-aluminum alloy. The greater the amount of aluminum present by weight in the alloy, however, the lower the energy density of the cell.

The form of the anode may vary, but preferably the anode is a thin metal sheet or foil of the anode metal, pressed or rolled on a metallic anode current collector, i.e., preferably comprising nickel, to form an anode component. In the exemplary cell of the present invention, the anode component has an extended tab or lead of the same material as the anode current collector, i.e., preferably nickel, integrally formed therewith such as by welding and contacted by a weld to a cell case of conductive material in a case-negative electrical configuration. Alternatively, the anode may be formed in some other geometry, such as a bobbin shape, cylinder or pellet to allow an alternate low surface cell design.

The electrochemical reaction at the cathode involves conversion of ions which migrate from the anode to the cathode into atomic or molecular forms. The cathode active material of the present invention comprises a low surface area, a single phase mixed metal oxide. A preferred single phase mixed metal oxide according to the present invention begins by thoroughly mixing silver nitrate with vanadium pentoxide. This mixture is first heated to about 2° C. to about 40° C. above the mixture's decomposition temperature. Preferably, the mixture is heated to about 300° C., which is about 20° C. above the decomposition temperature of the mixture, but below the decomposition temperature of the silver nitrate constituent alone. The mixture of starting materials is held at this temperature for about 5 hours to about 16 hours, or until the mixture has completely decomposed. After thoroughly grinding the resulting decomposed admixture, it is heated to a temperature of about 50° C. to about 250° C. above the decomposition temperature of the admixture for about 12 to 48 hours, or to about 490° C. to about 520° C. for about 48 hours for the silver nitrate and vanadium pentoxide admixture.

Table 1 below lists a summary of thermal analysis data for various ones of the starting materials of the present invention.

TABLE 1

| | Melting Point | Decomposition Starts |
|---|---|---|
| Silver Nitrate (AgNO$_3$) | 212° C. | 444° C. |
| Silver Carbonate (Ag$_2$CO$_3$) | 218° C. (d.) | — |
| Silver Nitrite (AgNO$_2$) | 140° C. (d.) | — |
| Silver Lactate (AgC$_3$H$_5$O$_3$) | 120° C. | |
| Silver Triflate (AgCF$_3$SO$_3$) | 286° C. | |
| Silver Pentafluoropropionate (AgC$_3$F$_5$O$_2$) | 242° C. | |
| Silver Laurate (AgC$_{12}$H$_{23}$O$_2$) | 212° C. | |
| Silver Myristate (AgC$_{14}$H$_{27}$O$_2$) | 211° C. | |
| Silver Palmitate (AgC$_{16}$H$_{31}$O$_2$) | 209° C. | |
| Silver Stearate (AgC$_{18}$H$_{35}$O$_2$) | 205° C. | |
| Copper Nitrate | 114.5° C. | —HNO$_3$,170° C. |
| Copper Carbonate | 200° C. 220° C. | — |
| Manganese Nitrate | 25.8° C. | 129.4° |
| Manganese Carbonate | (d.) | — |
| Silver Sulfide (acanthite) | tr. 175° C. | d. |
| Copper (II) Sulfide (covellite) | 103° C. | 220° C. (d.) |
| Manganese Sulfide | d. | — |
| Vanadium Oxide | 690° C. | 1,750° C. |
| Ammonium Metavanadate | d. | — |

(d.)—decomposes
(tr.)—transition point

Table 2 below lists a summary of the thermal analysis data for various decomposable mixtures of the starting materials set forth in Table 1.

TABLE 2

| | Mole Ratio | Melting Point | Decomposition Starts |
|---|---|---|---|
| Silver Nitrate + Vanadium Oxide | 1:1 | 207° C. | 280° C. |
| Silver Carbonate + Vanadium Oxide | 1:1 | 190° C. (d.) | — |
| Silver Nitrite + Vanadium Oxide | 1:1 | 108° C. (d.) | — |
| Copper Nitrate + Vanadium Oxide | 1:1 | 82° C. | 117° C. |

TABLE 2-continued

|  | Mole Ratio | Melting Point | Decomposition Starts |
|---|---|---|---|
| Copper Carbonate + Vanadium Oxide | 1:1 | 287° C. (d.) | — |
| Silver Nitrate, Copper Nitrate + Vanadium Oxide | 1:1:1 | 82° C. | −200° C. |

(d.)—decomposes
(tr.)—transition point

According to the present invention, any one of the decomposable starting materials is provided in a mixture with a metal, a metal oxide or a mixed metal oxide comprising at least a first and a second metals or their oxides and possibly a third metal or metal oxide, or a mixture of a first and a second metals or their metal oxides incorporated in the matrix of a host metal oxide. The cathode active material may also comprise a metal sulfide. The mixture is ground to ensure homogeneity and subsequently thermally treated to provide the novel low surface area, single phase mixed metal oxide cathode active material. Thus, the present synthesis protocol occurs in an oxygen-containing atmosphere at a decomposition heating temperature of about 80° C. to about 310° C. depending on the decomposable starting material constituent. The exact temperature at which decomposition begins is dictated by the starting materials.

Table 3 indicates the temperatures appropriate for the decomposition heating step using different silver precursor materials according to the present invention.

TABLE 3

SVO SYNTHESIS CONDITIONS

| Silver Precursor | Heating Temperature Above Decomposition Temperature |
|---|---|
| $AgNO_3$ | 300° C. |
| $Ag_2O$ | 440° C. |
| $Ag_2CO_3$ | 440° C. |
| $AgVO_3$ | 450° C. |

Those skilled in this art will readily recognize that various combinations of nitrates, nitrites, carbonates, sulfides and ammonium salts not listed in Table 2 are useful for preparation of single phase metal oxides according to the present invention. These include, but are not limited to, silver lactate and vanadium oxide; silver triflate and vanadium oxide; silver pentafluoropropionate and vanadium oxide; silver laurate and vanadium oxide; silver myristate and vanadium oxide; silver palmitate and vanadium oxide; silver stearate and vanadium oxide; manganese nitrate and vanadium oxide; manganese carbonate and vanadium oxide; manganese nitrite and vanadium oxide; silver sulfide and vanadium oxide; copper(II) sulfide and vanadium oxide; manganese sulfide and vanadium oxide; silver nitrate, manganese nitrate and vanadium oxide; copper nitrate, manganese nitrate and vanadium oxide; silver carbonate, copper carbonate and vanadium oxide; silver carbonate, manganese carbonate and vanadium oxide; copper carbonate, manganese carbonate and vanadium oxide; silver nitrate, copper nitrate and vanadium oxide; silver nitrate, manganese nitrite and vanadium oxide; copper nitrate, manganese nitrate and vanadium oxide; silver sulfide, copper(II) sulfide and vanadium oxide; silver sulfide, manganese sulfide and vanadium oxide; copper sulfide, manganese sulfide and vanadium oxide; silver sulfide, copper nitrate and vanadium oxide; silver sulfide, copper nitrite and vanadium oxide; silver sulfide, copper carbonate and vanadium oxide; silver nitrate, copper sulfide and vanadium oxide; silver nitrate, copper sulfide and vanadium oxide; silver carbonate, copper sulfide and vanadium oxide; silver sulfide, manganese nitrate and vanadium oxide; silver sulfide, manganese nitrite and vanadium oxide; silver sulfide, manganese carbonate and vanadium oxide, and combinations and mixtures thereof.

Those skilled in the art will also understand that Table 2 lists the various reactants in 1:1 mole ratios and their corresponding melting point and decomposition temperature. However, the mole ratio can be changed which will consequently change the melting point and decomposition temperature of the resulting mixtures.

One preferred low surface area, single phase mixed metal oxide substantially comprises an active material having the general formula $SM_xV_2O_y$ wherein SM is a metal selected from Groups IB to VIIB and VIII of the Periodic Table of Elements and wherein x is about 0.30 to 2.0 and y is about 4.5 to 6.0 in the general formula. By way of illustration, and in no way intended to be limiting, one exemplary single phase cathode active material substantially comprises silver vanadium oxide (SVO) having the general formula $Ag_xV_2O_y$, in any one of its phases, i.e., phase silver vanadium oxide having in the general formula x=0.35 and y=5.8, γ-phase silver vanadium oxide having in the general formula x=0.74 and y=5.37 and ε-phase silver vanadium oxide having in the general formula x=1.0 and y=5.5, the latter phase being most preferred.

The preparation technique of a low surface area, single phase mixed metal oxide according to the present invention produces an active material displaying increased capacity and decreased voltage delay in comparison to a mixed phase metal oxide such as silver vanadium oxide prepared using a decomposition synthesis from $AgNO_3$ and $V_2O_5$ starting materials carried out according to the previously referenced U.S. Pat. No. 4,391,729 to Liang et al. The discharge capacity and decreased voltage delay of the single phase metal oxide of the present invention is also an improvement over that of silver vanadium oxide typically prepared from $Ag_2O$ and $V_2O_5$ by a chemical addition reaction such as is described in U.S. Pat. No. 5,498,494 to Takeuchi et al., which is assigned to the assignee of the present invention and incorporated herein by reference.

Advantages of the use of this low surface area, single phase material include increased capacity and decreased voltage delay for pulse discharge applications. An example of such an application is the implantable cardiac defibrillator, where the battery may run under a light load for extended periods of time interrupted by high rate pulse discharge. The occurrence of voltage delay under these conditions is detrimental in that it may shorten device life.

Another preferred single phase composite cathode material is prepared from a homogeneous admixture of vanadium oxide and a second decomposable metal compound, metal or metal oxide and a third decomposable metal compound, metal or metal oxide wherein at least one of the second and third metal constituents is a decomposable form of silver and copper. According to the present invention, the homogeneous admixture is formed from $V_2O_z$ wherein z≦5 combined with a mixture of either copper nitrate, copper nitrite or an ammonium salt of copper and a silver oxide or, a mixture of copper oxide and silver nitrate, silver nitrite or an ammonium salt of silver to provide the single phase metal oxide having the formula $Cu_xAg_yV_2O_z$ (CSVO), preferably with $x \leq y$. In this preparation technique, the oxide starting materials may include $Ag_2O_z$ wherein $z=2$ to 1 and $CuO_z$ wherein $z=0$ to 1. Thus, this composite cathode active material may be described as a metal-metal oxide-metal oxide, or a metal-metal-metal oxide and the range of material compositions found for $Cu_xAg_yV2O_z$ is preferably about $0.01 \leq x \leq 1.0$, about $0.01 \leq y \leq 1.0$ and about $5.01 \leq z \leq 6.5$. Another embodiment of the present invention has vanadium oxide combined with both a decomposable compound of silver and copper. Typical single phase forms of CSVO are $Cu_{0.16}Ag_{0.67}V_2O_z$ with z being about 5.5 and $Cu_{0.5}Ag_{0.5}V_2O_z$ with z being about 5.75. U.S. Pat. No. 5,472,810 to Takeuchi et al. and U.S. Pat. No. 5,516,340 to Takeuchi et al. describe the prior art preparation of CSVO.

The above described active materials are formed into an electrode for incorporation into an electrochemical cell by mixing one or more of them with a conductive additive such as acetylene black, carbon black and/or graphite. Metallic materials such as nickel, aluminum, titanium and stainless steel in powder form are also useful as conductive diluents when mixed with the above listed active materials. The electrode further comprises a binder material which is preferably a fluoro-resin powder such as powdered polytetrafluoroethylene (PTFE) or powdered polyvinylidene fluoride (PVDF). More specifically, a preferred cathode active material comprises SVO in any one of its many phases, or mixtures thereof, mixed with a binder material and a conductive diluent.

A preferred cathode active admixture according to the present invention comprises from about 80% to 99%, by weight, of a cathode active material comprising SVO mixed with a suitable binder and a conductor diluent. The resulting blended cathode active mixture may be formed into a free-standing sheet prior to being contacted with a current collector to form the cathode electrode. The manner in which the cathode active mixture is prepared into a free-standing sheet is thoroughly described in U.S. Pat. No. 5,435,874 to Takeuchi et al., which is assigned to the assignee of the present invention and incorporated herein by reference. Further, cathode components for incorporation into the cell. may also be prepared by rolling, spreading or pressing the cathode active mixture of the present invention onto a suitable current collector. Cathodes prepared as described above may be in the form of one or more plates operatively associated with at least one or more plates of anode material, or in the form of a strip wound with a corresponding strip of anode material in a structure similar to a "jellyroll".

In order to prevent internal short circuit conditions, the cathode is separated from the anode material by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator materials include fabrics woven from fluoropolymeric fibers including polyvinylidine fluoride, polyethylene tetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.). The separator may also be composed of non-woven glass, glass fiber materials and ceramic materials.

The form of the separator typically is a sheet which is placed between the anode and cathode electrodes and in a manner preventing physical contact there between. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

The electrochemical cell of the present invention further includes a nonaqueous, lonically conductive electrolyte operatively associated with the anode and the cathode electrodes. The electrolyte serves as a medium for migration of ions between the anode and the cathode during the electrochemical reactions of the cell, and nonaqueous solvents suitable for the present invention are chosen so as to exhibit those physical properties necessary for ionic transport (low viscosity, low surface tension and wettability). Suitable nonaqueous solvents are comprised of an inorganic salt dissolved in a nonaqueous solvent and more preferably an alkali metal salt dissolved in a mixture of aprotic organic solvents comprising a low viscosity solvent including organic esters, ethers and dialkyl carbonates, and mixtures thereof, and a high permittivity solvent including cyclic carbonates, cyclic esters and cyclic amides, and mixtures thereof. Low viscosity solvents include tetrahydrofuran (THF), diisopropylether, methyl acetate (MA), diglyme, triglyme, tetraglyme, 1,2-dimethoxyethane (DME), 1,2-diethoxyethane (DEE), 1-ethoxy,2-methoxyethane (EME), dimethyl carbonate (DMC), diethyl carbonate (DEC), dipropyl carbonate (DPC), ethylmethyl carbonate (EMC), methylpropyl carbonate (MPC) and ethylpropyl carbonate (EPC), and mixtures thereof. High permittivity solvents include propylene carbonate (PC), ethylene carbonate (EC), butylene carbonate (BC), acetonitrile, dimethyl sulfoxide, dimethyl formamide, dimethyl acetamide, γ-valerolactone, γ-butyrolactone (GBL) and N-methyl-pyrrolidinone (NMP), and mixtures thereof.

The preferred electrolyte comprises an inorganic alkali metal salt, and in the case of an anode comprising lithium, the alkali metal salt of the electrolyte is a lithium based salt. Known lithium salts that are useful as a vehicle for transport of alkali metal ions from the anode to the cathode include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiNO_3$, $LiO_2$, $LiB(C_6H_5)_4$ and $LiCF_3SO_3$, and mixtures thereof. Suitable salt concentrations typically range between about 0.8 to 1.5 molar, and a preferred electrolyte for a lithium/transition metal oxide electrochemical cell includes $LiAsF_6$ or $LiPF_6$ dissolved in a 50:50 mixture, by volume, of PC and DME.

In the present invention, the preferred electrochemical cell has an anode of lithium metal and a cathode of the transition mixed metal oxide $AgV_2O_{5.5}$ prepared in a thermal decomposition reaction by heating the mixture of starting materials to a first temperature above the decomposition temperature of the mixture followed by heating to a second temperature of about 490° C. to about 520° C., as previously described in detail. The activating electrolyte is 1.0M to 1.4M $LiAsF_6$ dissolved in an aprotic solvent mixture comprising at least one of the above listed low viscosity solvents and at least one of the above listed high permittivity solvents having an organic carbonate additive provided therein. The preferred aprotic solvent mixture comprises a 50/50 mixture, by volume, of propylene carbonate and dimethoxyethane.

The assembly of the cell described herein is preferably in the form of a wound element cell. That is, the fabricated cathode, anode and separator are wound together in a "jellyroll" type configuration or "wound element cell stack" such that the anode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with components of the cell.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23 or FUSITE 425 or FUSITE 435. The positive terminal pin feedthrough preferably comprises titanium although molybdenum, aluminum, nickel alloy, or stainless steel can also be used. The cell header comprises elements having compatibility with the other components of the electrochemical cell and is resistant to corrosion. The cathode lead is welded to the positive terminal pin in the glass-to-metal seal and the header is welded to the case containing the electrode stack. The cell is thereafter filled with the electrolyte solution comprising at least one of the carbonate additives described hereinabove and hermetically sealed such as by close-welding a stainless steel ball over the fill hole, but not limited thereto.

The above assembly describes a case-negative cell, which is the preferred construction of the exemplary cell of the present invention. As is well known to those skilled in the art, the exemplary electrochemical system of the present invention can also be constructed in a case-positive configuration.

The following examples describes the manner and process of an electrochemical cell according to the present invention, and they set forth the best mode contemplated by the inventors for carrying out the invention, but they are not to be construed as limiting.

EXAMPLE I

An improved silver vanadium oxide cathode material was synthesized by a multistep thermal decomposition method including a final heating temperature of 500° C. Specifically, a mixture of silver nitrate ($AgNO_3$) and vanadium pentoxide ($V_2O_5$) in a 1:1 mole ratio was heated in the presence of air using the following protocol:

Step 1 Heated mixture to above its decomposition temperature, i.e., to about 300° C. for about 16 hours, Step 2 Cooled the resulting decomposed admixture to room temperature and ground thoroughly, and Step 3 Heated decomposed admixture to about 500° C. for about 12 to 48 hours.

Figure 2:
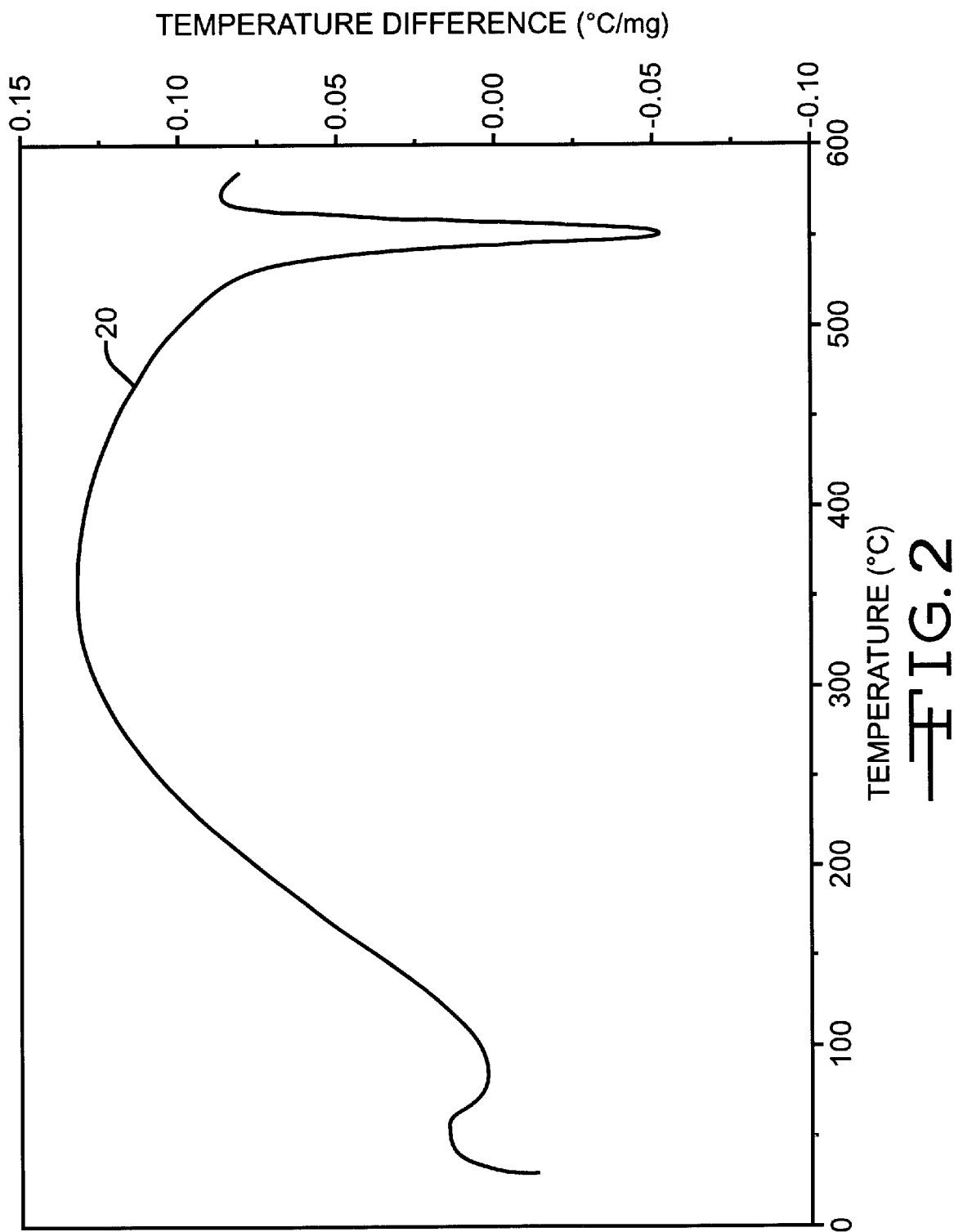
FIG. 2 is a graph constructed from a 1:1 mole ratio of AgNO$_3$ and V$_2$O$_5$ reacted in a decomposition reaction according to the present invention.

During step 1 of the synthesis the thermal decomposition of $AgNO_3$ occurs, and $NO_x$ gas is liberated until a temperature of about 300° C. Grinding following the 300° C. step to mix the sample after decomposition of the silver salt is critical in forming a homogeneous SVO material. The high temperature of step 3 produces a single phase material with low surface area. The combination of these steps produces a homogeneous ε-phase SVO cathode material having x=1.0 and y=5.5 in the general formula $Ag_xV_2O_y$, as determined by differential thermal analysis (DTA) which has a surface area, as determined by BET surface area analysis, of about 0.2 $m^2$/gram to about 0.80 $m^2$/gram. The result of the DTA analysis is presented in FIG. 2, curve 20, where it is clear that a unitary phase product is produced.

It must be noted that the temperature given in step 1 of scheme 1 is appropriate for the use of silver nitrate in the reaction. As indicated above, silver nitrate decomposes below 300° C. in the presence of vanadium oxide. Thus, the temperature of step 1 was specifically set above the decomposition point of the silver nitrate/vanadium oxide mixture. When using a different silver precursor, the temperature of step 1 needs to be changed to above the reaction temperature of the mixture of the silver precursor mixed with vanadium oxide.

Comparative Example I

Figure 3:
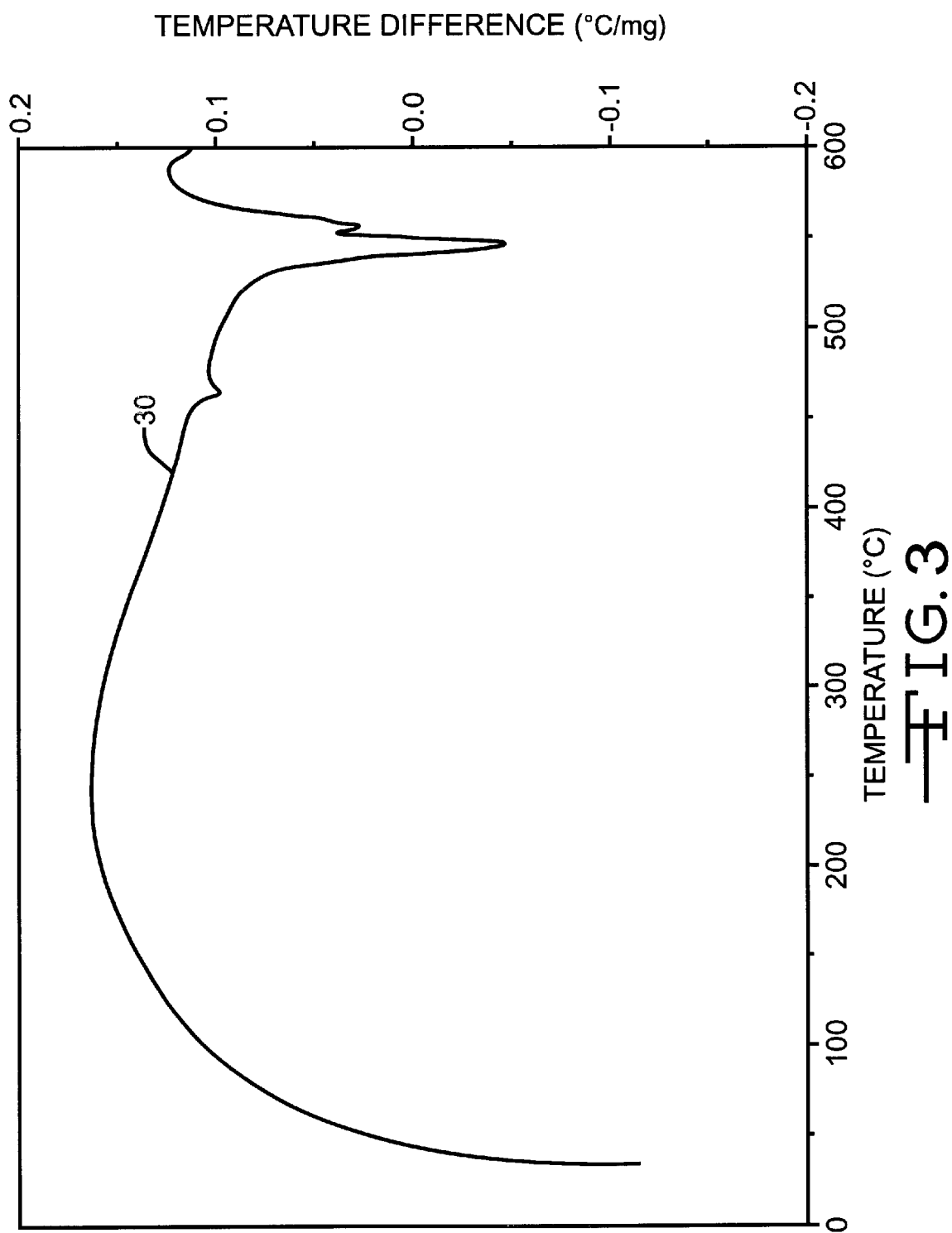
FIG. 3 is a graph constructed from a 1:2 mole ratio of Ag$_2$O and V$_2$O$_5$ reacted in a decomposition reaction with an initial heating temperature of 300° C. followed by a final heating temperature of 500° C.

As a comparison to SVO synthesized at a final temperature of 500° C., the reaction of silver oxide ($Ag_2O$) with vanadium oxide ($V_2O_5$) in a 1:2 mole ratio was performed according to the protocol set forth in Example I, even though silver oxide only reacts with vanadium oxide above 300° C. The resulting product of this reaction was analyzed by DTA, as presented in FIG. 3, curve 30, where it is clear that a mixture of phases exist in the SVO product.

EXAMPLE II

Figure 4:
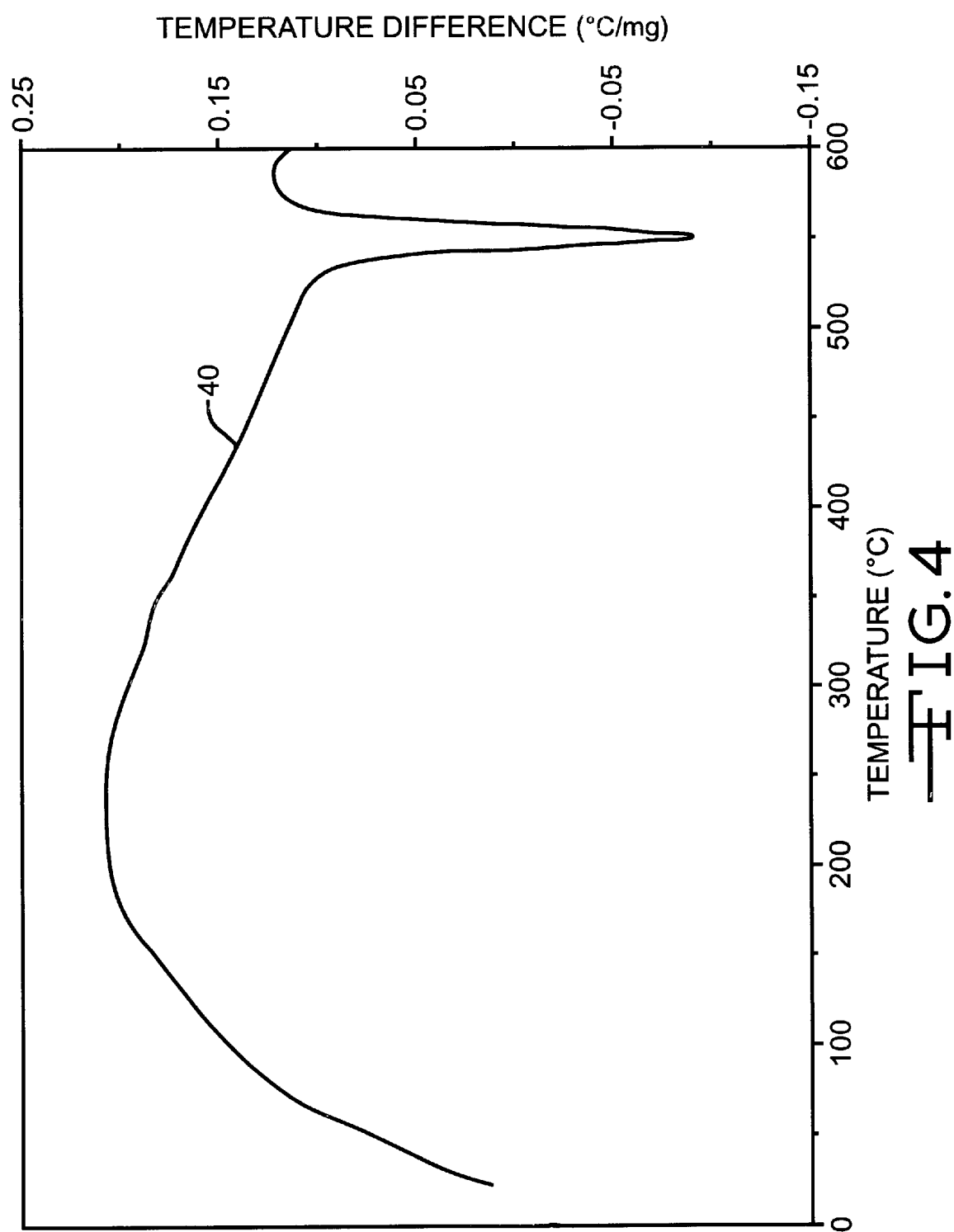
FIG. 4 is a graph constructed from a 1:2 mole ratio of Ag$_2$O and V$_2$O$_5$ reacted in a decomposition reaction with an initial heating at 440° C. followed by a final heating at 500° C.

Another sample was prepared using $Ag_2O$ and $V_2O_5$ in a 1:2 mole ratio according to the protocol set forth in Example I, except that the temperature of step 1 was changed to 440° C. This material was also thermally analyzed by DTA, and the results are presented in FIG. 4, curve 40. This material displays a single endotherm assigned to ε-phase SVO. Thus, the temperature of step 1 is important in preparing a homogeneous SVO material, and must be set above the reaction temperature of the silver precursor with vanadium oxide.

Comparative Example II

Figure 5:
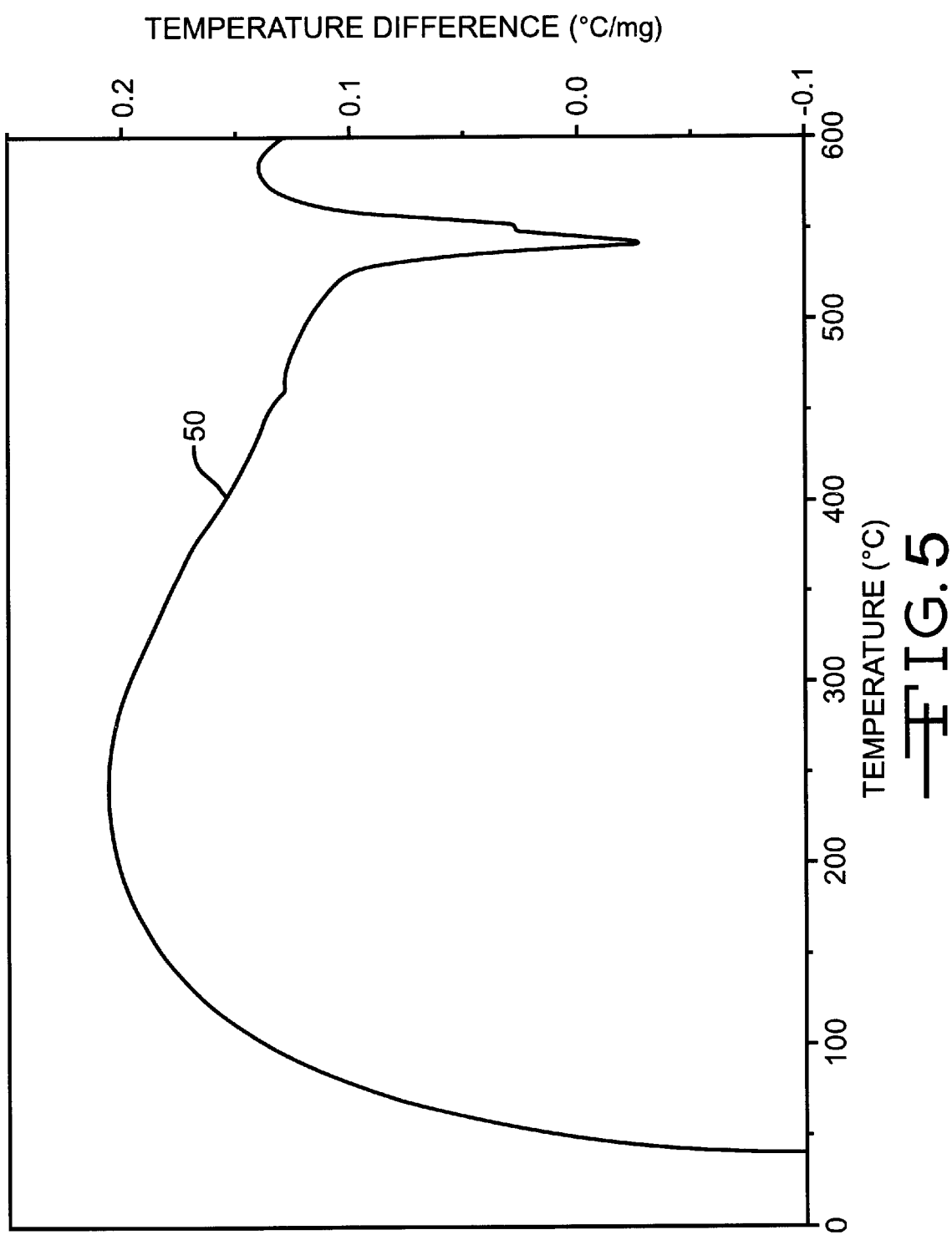
FIG. 5 is a graph constructed from a 2:1 mole ratio of AgVO$_3$ and V$_2$O$_5$ prepared with an initial heating of 300° C. followed by a final heating temperature of 500° C.

Silver vanadium oxide was prepared from a mixture of silver vanadate ($AgVO_3$) and $V_2O_5$ in a 2:1 mole ratio. FIG. 5, curve 50, shows the DTA of the reaction product from these starting materials prepared according to the protocol set forth in Example I. Like SVO prepared from silver oxide, this sample displays multiple isotherms, indicating the presence of mixed phases, when a 300° C. temperature is used in step 1.

EXAMPLE III

Figure 6:
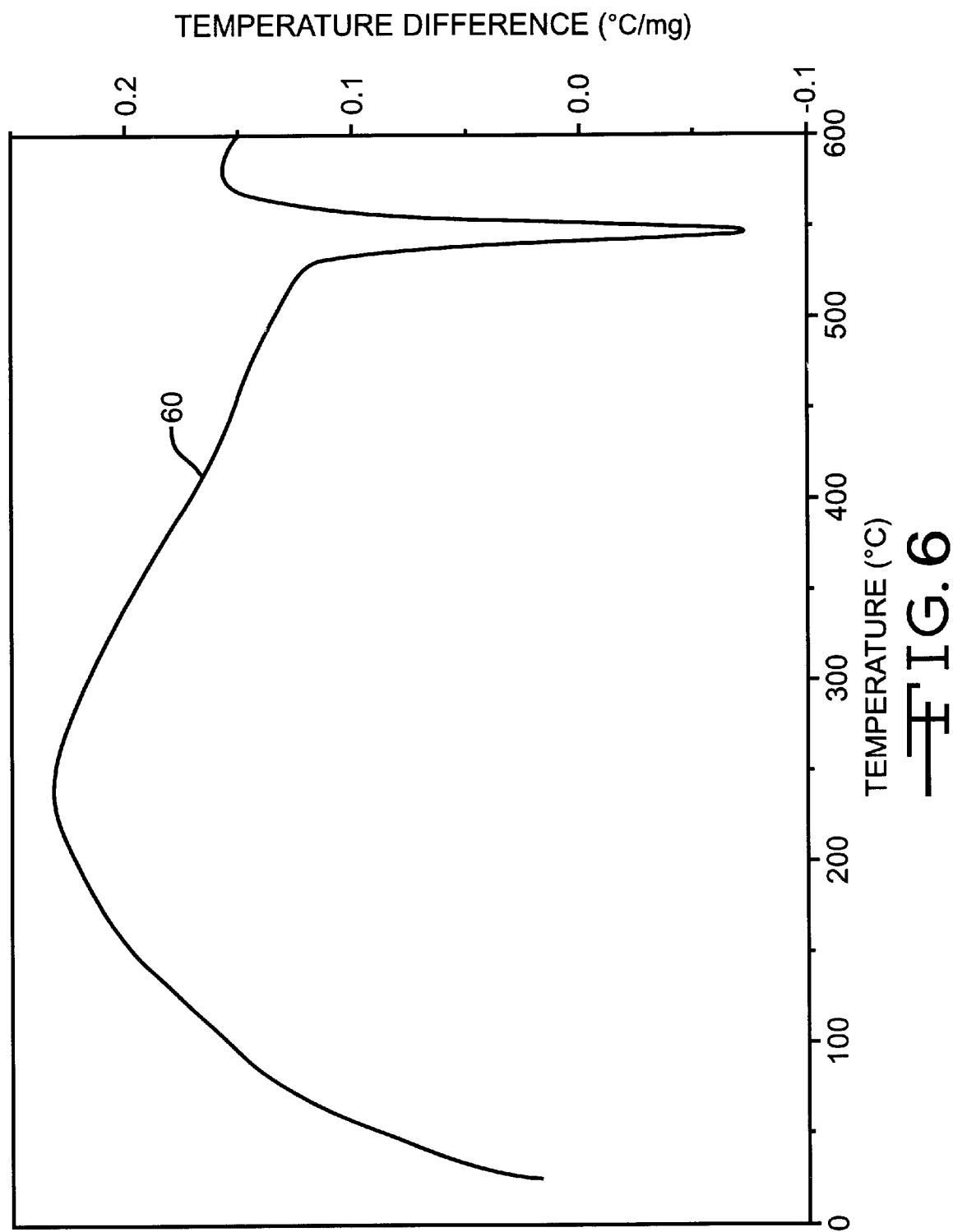
FIG. 6 is a graph constructed a 2:1 mole ratio of AgVO$_3$ and V$_2$O$_5$ prepared with an initial heating temperature of 450° C. followed by a final heating at 500° C.

FIG. 6, curve 60, shows the DTA of SVO prepared from a 2:1 mole ratio of $AgVO_3$ and $V_2O_5$ using protocol 1 with a 450° C. temperature used for the thermal treatment in step 1. This sample displays a single peak in the DTA curve.

EXAMPLE IV

The discharge performance of a low surface area, single phase mixed metal oxide cathode material in comparison to a prior art material was tested in hermetically-sealed electrochemical cells. Test cells according to the present invention used a single phase SVO prepared at a final heating temperature of about 500° C. for 48 hours and having a surface area of about 0.6 $m^2$/g. In comparison, control cells contained SVO manufactured at a final heating temperature of about 375° C. for 48 hours and according to Liang et al. having a surface area of about 1.1 $m^2$/g. The present invention and prior art test cells contained cathodes consisting of a mixture of 94% of SVO (by weight) along with 3% PTFE, 2% graphite, and 1% carbon black, pressed onto an expanded titanium current collector. A total of 7.92 grams of cathode mix was utilized in each cell. The cathodes were separated from an anode of lithium metal contacted to an expanded nickel current collector by a polypropylene separator. The cells were filled with 1M LiAsF$_6$ PC/DME electrolyte.

Pulse testing of the Li/SVO cells was accomplished under long-term test conditions which mimic use of the cell in an implantable medical device such as a cardiac defibrillator. The cells were subjected to constant current pulses of 2.0 Amps for 10 seconds in duration with 15 seconds of rest between pulses. During discharge the current pulses were applied in groups of 4 every 106 days with a constant resistance background load of 33.2 kΩ at 37° C. Pulse testing consisted of pulses applied about every 106 days superimposed on a 33.2 kΩ background load. This is referred to as 36-month or 3-year accelerated discharge data (ADD) testing.

Figure 7:
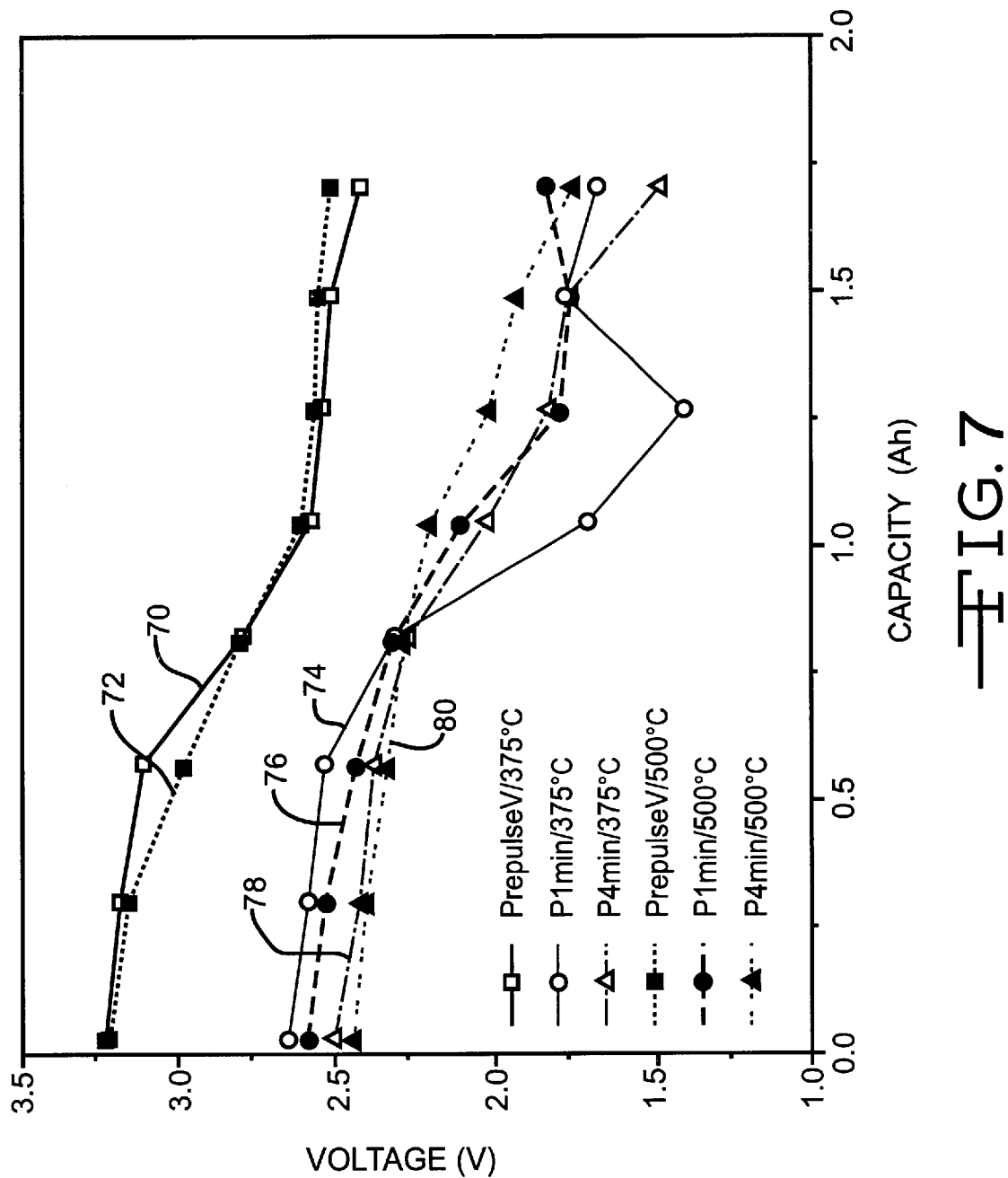
FIGS. 7 and 8 display the results of prior art and present invention Li/SVO cells discharged under a 36 and 60 month accelerated discharge data regime, respectively.
Figure 8:
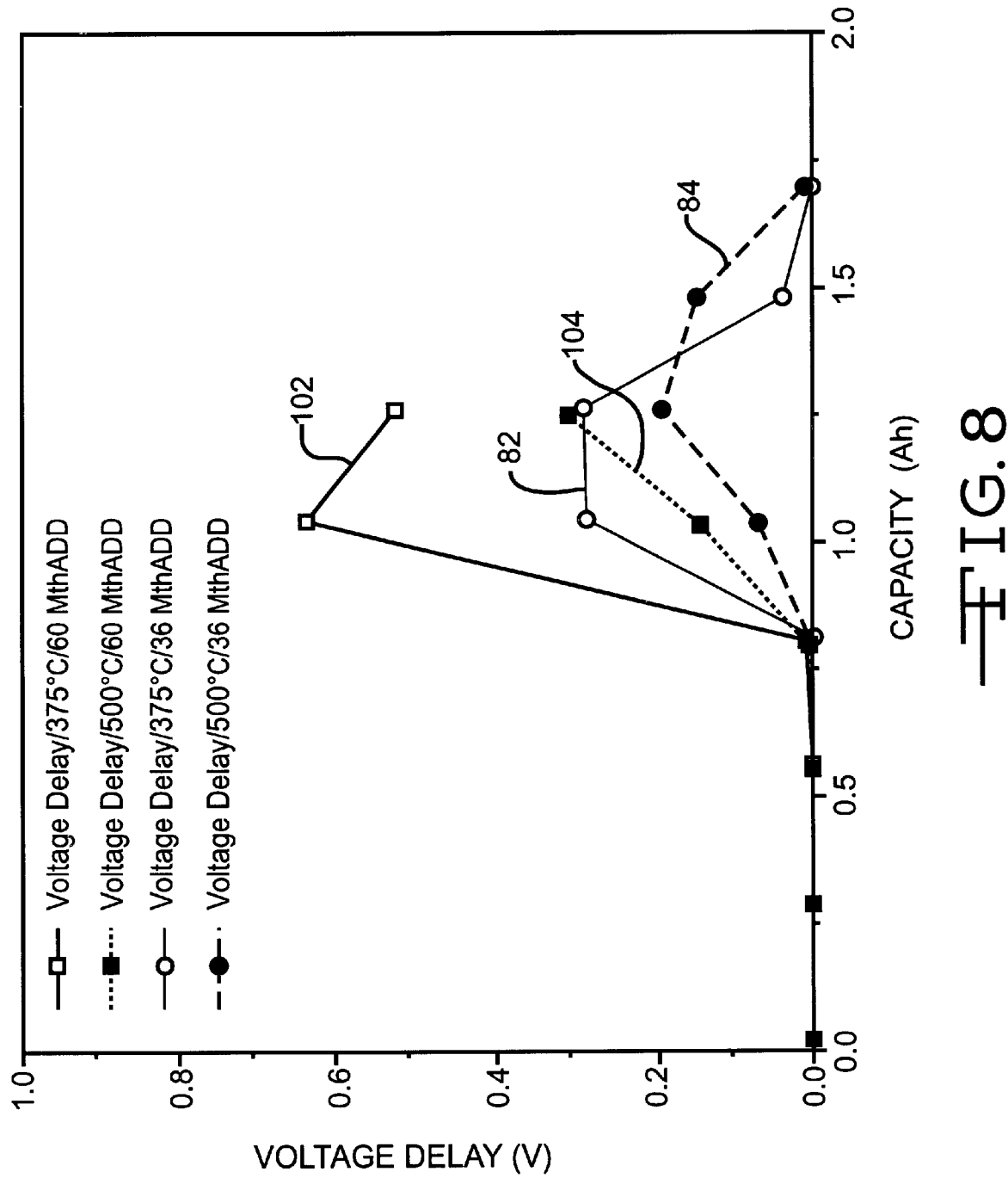

FIG. 7 displays a graphic overlay of the prepulse voltage, pulse 1 minima and pulse 4 minima for each group of cells. The voltage delay plotted in FIG. 8 is equal to the pulse 1 final voltage minus pulse 1 minima voltage. All graphs plot the average of four cells in each group. In particular, curve 70 was constructed from the prepulse voltage of the cell group including the prior art SVO material having a surface area of about 1.1 m$^2$/g and curve 72 was constructed from the present invention cell group including the SVO material having a surface area of about 0.6 m$^2$/g. Curves 74 and 76 were constructed from the average P1 minima potentials of those cell groups and curve 78 and 80 were constructed from the average P4 minima voltages of the respective cell groups.

In FIG. 8, curve 82 was constructed from the average voltage delay of the prior art cell group including the 1.1 m$^2$/g SVO material discharged under the 36-month ADD test and curve 84 was constructed from the average voltage delay of the prior art cell group including the 0.6 m$^2$/g SVO material discharged under the same regime.

EXAMPLE V

A second set of prior art and present invention cells were discharged under a 60-month ADD test. The 60-month ADD test is still in progress at the time of filing this application. Again, the prior art SVO material was prepared according to Liang et al. and had a surface area of about 1.1 m$^2$/g produced at a final heating temperature of 375° C. for 48 hours while the present invention SVO material was prepared at a final heating temperature of about 500° C. for about 48 hours and had a surface area of about 0.5 m$^2$/g. The testing utilized 2.0 Amp pulses, 10 seconds in duration applied 15 seconds apart in groups of four applied every 6 months with a 56.2 kΩ load.

Figure 9:
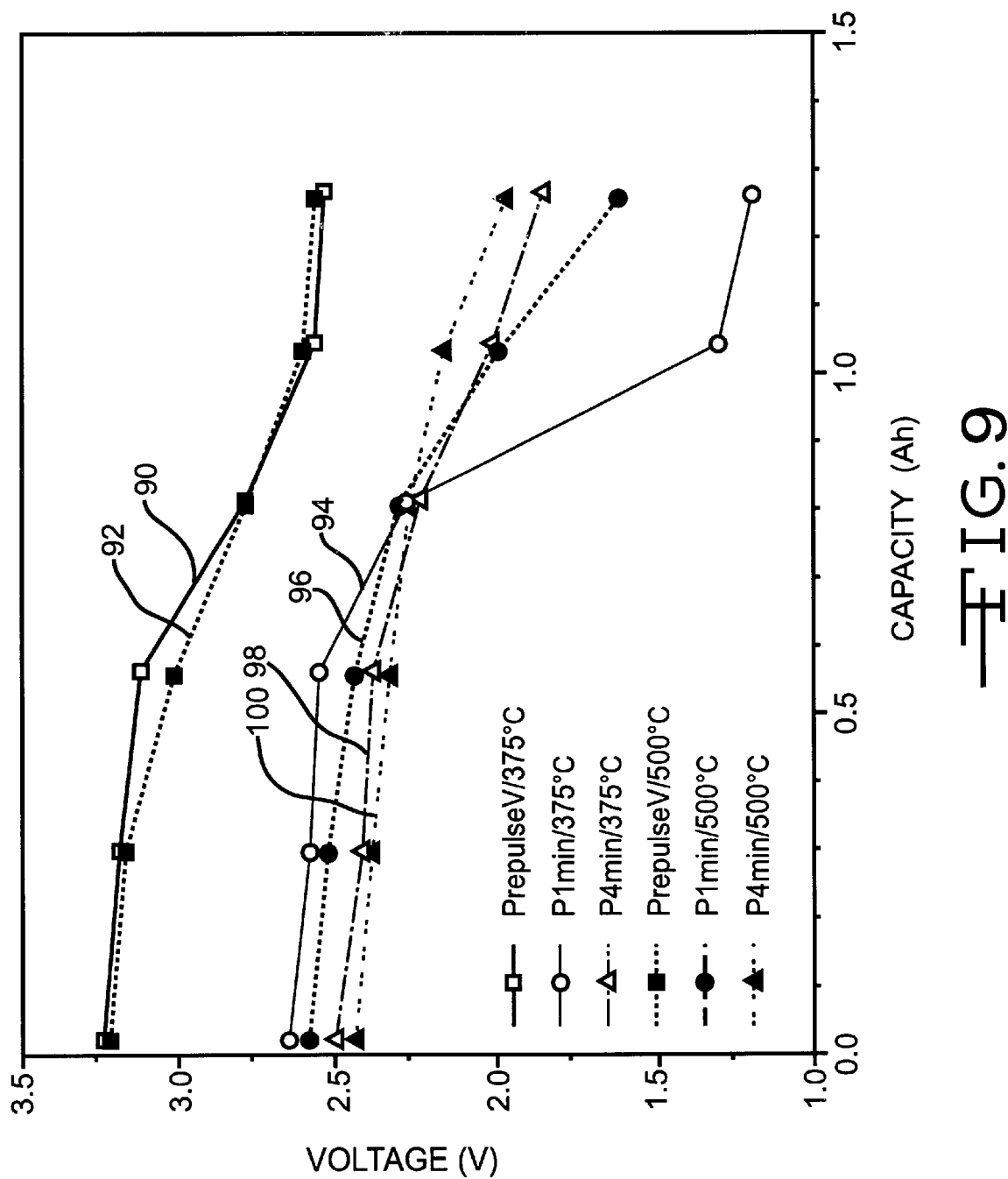
FIG. 9 is a graph of the voltage delay from the cells used to construct FIGS. 7 and 8.

FIG. 9 dispalays a graphic overlay of the prepulse voltage, pulse 1 minima and pulse 4 minima for each group of cells. In particular, curve 90 was constructed for the prepulse voltage of the prior art cells having SVO material with a surface area of about 1.1 m$^2$/g and curve 92 was constructed from the present invention cell group including the SVO material having a surface area of about 0.6 m$^2$/g. Curves 94 and 96 were constructed from the average P1 minima potentials of those cell groups and curve 98 and 100 were constructed from the average P4 minima voltages of the respective cell groups.

In FIG. 8, 102 was constructed for the average voltage delay of the prior art cell group including the 1.1 m$^2$/g SVO material discharged under the 60-month ADD test and curve 104 was constructed from the average voltage delay of the present invention cell group having the 0.6 m$^2$/g SVO material discharged under the same regime.

As can be seen from the graphs in FIGS. 7 to 9, the cells with SVO prepared. at 500° C. have much higher pulse voltages and less voltage delay than the cells containing SVO prepared at 375° C., particularly during latter stages of cell discharge. As described in the SUMMARY OF THE INVENTION section, voltage delay is a phenomenon that typically occurs in Li/SVO cells that have been depleted of about 40% to about 70% of their capacity. The greater the separation between P1 minima voltage and P4 minima voltage, the greater the voltage delay.

Thus, according to the present invention, the use of SVO prepared from a multistep synthesis with a final temperature of 490° C. to 520° C. and having a surface area of about 0.2 m$^2$/g to about 0.8 m$^2$/g provides the benefits of increased pulse voltages and less voltage delay in comparison to SVO material prepared at a final heating temperature of 375° C. according to the prior art. Lower pulse voltages caused by voltage delay, even if only temporary, are undesirable since they can cause circuit failure in device applications, and effectively result in shorter cell life.

EXAMPLE VI

Figure 10:
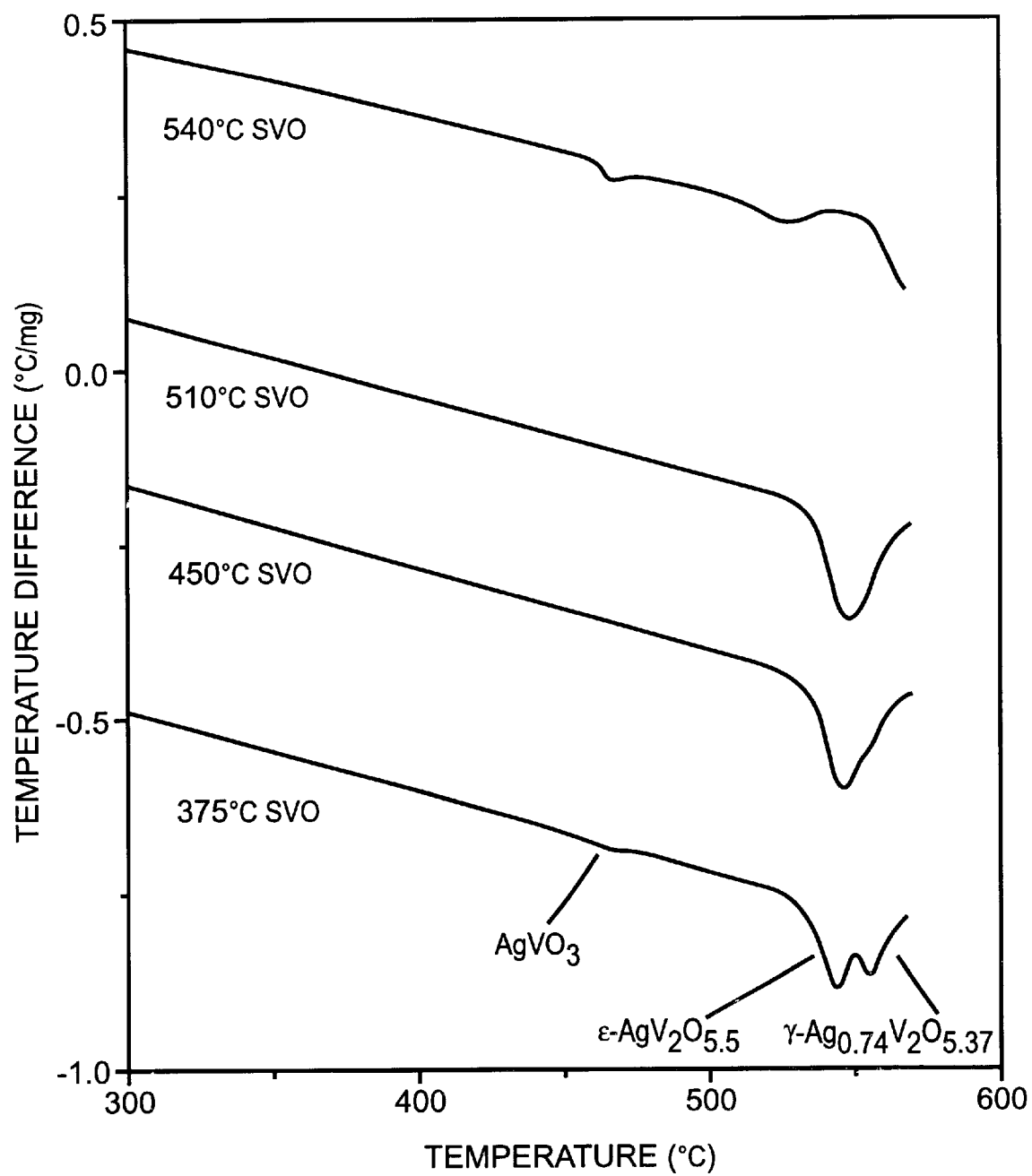
FIG. 10 is a graph of Differential Thermal Analysis curves from SVO material prepared at various heating temperatures.

FIG. 10 displays an overlay of Differential Thermal Analysis (DTA) curves for SVO materials prepared at 375° C., 450° C., 510° C. and 540° C. This experiment was conducted by heating the SVO samples at a rate of 20° C./min. under an argon purge. The presence of peaks in the DTA curves indicates phase transitions that are characteristic for known phases of SVO. Thus, DTA is a good technique for detecting the presence of impurity phases in SVO cathode materials. As can be seen in FIG. 10, as the temperature of the SVO synthesis increased from 375° C. to 510° C., the amount of impurity materials, silver vanadate (AgVO$_3$) and γ-phase decreases. From these curves it is clear that there is advantage to using the 500° C. to 520° C. temperature range for synthesis of SVO over the previously reported temperatures of 375° C. or 450° C. In addition to the lower surface area provided by the higher temperature synthesis, the present invention provides increased purity in terms of purer AgV$_2$O$_{5.5}$ in the product SVO material. These DTA curves also show that SVO prepared at 540° C., above the preferred range of 500° C. to 520° C., contain an increased amount of silver vanadate impurity and a loss of the peak due to ε-phase SVO, the desired SVO material.

The desirable increase in pulse voltages and decrease in voltage delay for lithium cells containing SVO prepared with a final temperature of about 490° C. to about 520° C. are new and unexpected results which can be traced to the lower surface area of these materials. The relationship between long-term test results and surface area of the SVO material is a new finding, where lower surface SVO displays a significant advantage over the prior art material. In addition, the increase in usable cell capacity, and subsequent increase in battery life using this improved cathode material for long-term test is unexpected based on the published capacity data for 450° C. SVO discharged under quick discharge conditions.

The previously discussed publication by R. A. Leising and E. S. Takeuchi, *Chemistry of Materials*, 5,738–742 (1993) discloses that the 375° C. prepared SVO material gave slightly higher delivered capacity than the 450° C. material and significantly higher capacity than the SVO material prepared at 540° C.

Thus, the increase in pulse voltages and desirable decrease in voltage delay found for lithium cells containing silver vanadium oxide cathode active material prepared in a temperature range of about 490° C. to about 520° C. and activated with an electrolyte comprising 1M $LiAsF_6$ dissolved in a 50:50 mixture, by volume, of PC and DME are new and unexpected results attributable to the present invention.

It is appreciated that various modifications to the present inventive concepts described herein may be apparent to those of ordinary skill in the art without disparting from the spirit and scope of the present invention as defined by the herein appended claims.

What is claimed is:

1. An electrochemical cell comprising an alkali metal anode; a cathode; and a nonaqueous electrolyte operatively associated with the anode and the cathode, the improvement in the cell comprising:

the cathode comprising silver vanadium oxide characterized as having been produced from a first silver constituent selected from the group consisting of $AgNO_3$, $AgNO_2$, $Ag_2O$, $Ag_2CO_3$, $Ag(CH_3CO_2)$, $AgVO_3$, elemental silver, and mixtures thereof and a vanadium oxide as a second constituent, wherein a mixture of the first and second constituents is heated to a first temperature about 2° C. to about 40° C. above a decomposition temperature of the mixture, followed by grinding and wherein the mixture is then heated to a second temperature about 50° C. to about 250° C. above the decomposition temperature of the mixture.

2. The electrochemical cell of claim 1 wherein the vanadium oxide is vanadium pentoxide.

3. The electrochemical cell of claim 1 wherein the silver vanadium oxide is characterized as having been formed in an atmosphere selected from the group consisting of air and oxygen.

4. The electrochemical cell of claim 1 wherein the first constituent is $AgNO_3$ and the first temperature is about 300° C. and the second temperature is about 490° C. to about 520° C.

5. The electrochemical cell of claim 1 wherein the silver vanadium oxide has a surface area of about 0.2 $m^2$/gram to about 0.8 $m^2$/gram.

6. The electrochemical cell of claim 1 wherein the anode is of lithium and a lithium salt is dissolved in the electrolyte.

7. An electrochemical cell, which comprises:

a) an anode comprising an alkali metal;

b) a cathode comprising silver vanadium oxide characterized as having been produced from $AgNO_3$ as a first constituent and a vanadium oxide as a second constituent, wherein a 1:1 mole mixture of the first and second constituents is heated to about 282° C. to about 320° C., followed by cooling the mixture below its decomposition temperature of about 280° C. and grinding and wherein the mixture is then heated to a second temperature of about 490° C. to about 520° C.; and c) a nonaqueous electrolyte activating the anode and the cathode.

8. The electrochemical cell of claim 7 wherein the silver vanadium oxide has a surface area of about 0.2 $m^2$/gram to about 0.8 $m^2$/gram.

9. The electrochemical cell of claim 7 wherein the nonaqueous electrolyte comprises a low viscosity solvent selected from the group consisting of an ester, an ether, a dialkyl carbonate, and mixtures thereof.

10. The electrochemical cell of claim 9 wherein the low viscosity solvent is selected from the group consisting of diisopropylether, 1,2-dimethoxyethane, 1,2-diethoxyethane, 1-ethoxy, 2-methoxyethane, dimethyl carbonate, diethyl carbonate, dipropyl carbonate, ethyl methyl carbonate, methyl propyl carbonate, ethyl propyl carbonate, methyl acetate, tetrahydrofuran, diglyme, triglyme, tetraglyme, and mixtures thereof.

11. The electrochemical cell of claim 7 wherein the nonaqueous solvent comprises a high permittivity solvent selected from the group consisting of a cyclic carbonate, a cyclic ester, a cyclic amide, and mixtures thereof.

12. The electrochemical cell of claim 11 wherein the high permittivity solvent is selected from the group consisting of propylene carbonate, ethylene carbonate, butylene carbonate, γ-valerolactone, γ-butyrolactone, N-methylpyrrolidinone, dimethyl sulfoxide, acetonitrile, dimethyl formamide, dimethyl acetamide, and mixtures thereof.

13. The electrochemical cell of claim 7 wherein the electrolyte is selected from the group consisting of $LIPF_6$, $LiAsF_6$, $LiSbF_6$, $LiBF_4$, $LiClO_4$, $LiAlCl_4$, $LiGaCl_4$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiNO_3$, $LiB(C_6H_5)_4$, $LiCF_3SO_3$, and mixtures thereof.

14. The electrochemical cell of claim 7 wherein the silver vanadium oxide is substantially of the general formula $Ag_xV_2O_y$ selected from one of an ε-phase with x=1.0 and y=5.5, γ-phase with x=0.74 and y=5.37 and β-phase with x=0.35 and y=5.8.

15. The electrochemical cell of claim 7 wherein the cathode comprises from about 80 weight percent to about 99 weight percent of the silver vanadium oxide.

16. The electrochemical cell of claim 7 wherein the cathode further comprises a conductive additive.

17. The electrochemical cell of claim 7 wherein the cathode further comprises a binder material.

18. The electrochemical cell of claim 7 wherein the electrolyte comprises a solution of a Group IA metal salt dissolved in a nonaqueous solvent.

19. The electrochemical cell of claim 7 wherein the anode is lithium.

20. A method for providing an electrochemical cell activated with a nonaqueous electrolyte, comprising the steps of:

a) providing an anode comprising an alkali metal;

b) providing a cathode comprising silver vanadium oxide produced from a first silver constituent selected from the group consisting of $AgNO_3$, $AgNO_2$, $Ag_2O$, $Ag_2CO_3$, $Ag(CH_3CO_2)$, $AgVO_3$, elemental silver, and mixtures thereof and a vanadium oxide as a second constituent, wherein a mixture of the first and second constituents is heated to a first temperature about 2° C. to about 40° C. above a decomposition temperature of the mixture, followed by grinding and wherein the mixture is then heated to a second temperature of about 490° C. to about 520° C.; and c) activating the anode and the cathode with the nonaqueous electrolyte.

21. The method of claim 20 including providing the silver vanadium oxide having a surface area of about 0.2 $m^2$/gram to about 0.8 $m^2$/gram.

22. The method of claim 20 wherein the vanadium oxide is vanadium pentoxide.

23. The method of claim 20 including providing the nonaqueous electrolyte comprising a low viscosity solvent selected from the group consisting of an ester, an ether, a dialkyl carbonate, and mixtures thereof.

24. The method of claim 20 including providing the nonaqueous electrolyte comprising a high permittivity solvent selected from the group consisting of a cyclic carbonate, a cyclic ester, a cyclic amide, and mixtures thereof.

25. The electrochemical cell of claim 7 wherein the mixture is cooled to an ambient temperature before being heated to the second temperature.

26. A method for providing an electrochemical cell activated with a nonaqueous electrolyte, comprising the steps of:
   a) providing an anode comprising an alkali metal;
   b) providing a cathode comprising silver vanadium oxide produced from $AgNO_3$ as a first constituent and a vanadium oxide as a second constituent, wherein after mixing the first and second constituents, they are heated to a first temperature of about 282° C. to about 320° C., followed by grinding and followed by heating the mixture to a second temperature of about 490° C. to about 520° C.; and
   c) activating the anode and the cathode with the nonaqueous electrolyte.

27. The method of claim 26 including providing the silver vanadium oxide having a surface area of about 0.2 $m^2$/gram to about 0.8 $m^2$/gram.

28. The method of claim 26 wherein the vanadium oxide is vanadium pentoxide.

29. The method of claim 26 including cooling the mixture to an ambient temperature before it is heated to the second temperature.

* * * * *